Aug. 3, 1943.  L. J. A. LAVALLEE  2,326,041
PLASTIC MOLDING
Filed July 13, 1942
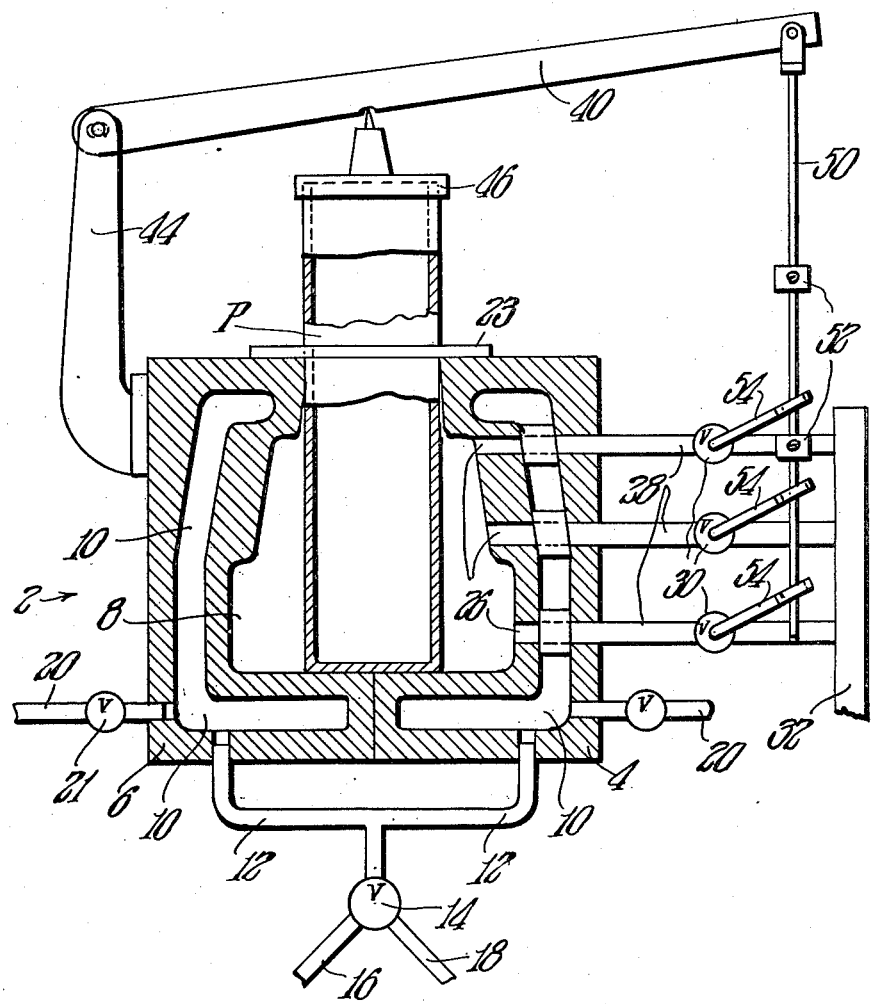
INVENTOR.
Louis Joseph Aime Lavallee
BY Walter C. Roe, Attorney Patented Aug. 3, 1943

2,326,041

UNITED STATES PATENT OFFICE 2,326,041

PLASTIC MOLDING

Louis Joseph Aime Lavallee, Springfield, Mass.

Application July 13, 1942, Serial No. 450,744

2 Claims. (Cl. 18—35)

This invention relates to processes of and apparatus for forming objects and is directed more particularly to the forming or molding of plastic objects.

The principal objects of the invention are directed to the provision of a process of and apparatus for the forming or molding of plastic objects preferably by successive steps thereby making it possible to proceed from a partially formed to a completely formed object.

It is difficult, if not impossible, to mold certain plastic objects due to their contour, the difficulty in forming the molds and for other reasons, and according to this invention it is possible to form objects in a great variety of shapes and forms.

According to this invention, a preformed or partially formed cup or tube is made from plastic material having shape changing characteristics when subjected to heat, and is subsequently subjected to shape changing operation making it possible to thereby produce objects difficult or impossible to produce by the conventional molding operations.

Various novel features and advantages of the invention will be observed from the following description of the preferred form thereof reference being had to the accompanying drawing wherein:

The figure is a more or less diagrammatic sectional view through an apparatus embodying the novel features of the invention and adapted for carrying out the novel process.

Referring now to the drawing more in detail, the invention will be fully described.

A mold 2 is provided which may include a plurality of separable mold forming parts 4 and 6 which when in mold-forming relation provide a cavity 8.

The mold parts are heated in some suitable manner as by passageways 10 for a heating medium such as steam. Otherwise the mold parts may be heated by electric or other heating elements.

Also the passageways may be used for a cooling medium and to that end connections 12 lead from a control valve 14 which receives either a heating or cooling medium from connections 16 and 18. The valve 14 may be of the well known type to connect the connections 12 to either of the pipes 16 or 18. The cooling or heating medium may be discharged from the mold through pipes 20 which include valves 21.

A partially formed plastic member P preferably in the form of a cup is provided which is made from plastic adapted under the influence of heat to flow or change its shape. That is, such plastic is employed as tends to soften when subjected to heat and harden when cooled so that its form may be changed. The member P is inserted into the mold and preferably with a packing member 23 therearound which rests on the mold to seal the cavity thereof.

Passageways 26 are provided which are in communication with the cavity 8 and to these are connected conduits 28 which include valves 30. Connections such as shown lead from the valves 30 to a source of suction such as a pipe 32 connected to a vacuum pump or the like, not forming a part of the invention and therefor not shown.

The cup P is placed in the mold and the mold is heated to soften the cup so that it is adapted for the shape changing function. The cavity is subjected to suction so that the relatively soft cup is drawn towards the cavity walls to conform therewith and thereby the cup is transformed into the finally molded object according to the form of the cavity.

Preferably the suction is applied progressively or in a step-by-step manner longitudinally along the cavity and may be accomplished by operating the valves 30 for that purpose. This may be accomplished, however, more or less automatically.

For instance a lever 40 is pivoted at 42 to a bracket 44 and may rest on a cap 46 that is disposed on the upper end of the cup P, as shown. A rod 50 carried by the free end of lever 40 may include abutments 52 adjustable therealong that engage levers 54 of the valves 30.

In the operation of the apparatus with the cup in the cavity and with the mold heated the lowermost valve 30 may be opened so that the lower part of the cup is expanded or drawn into contact with the lower portion of the mold. As this occurs, the upper end of the cup moves downwardly so that lever 40 swings downwardly and the lower projection 52 of rod 50 engages and opens the next lowermost valve. In this way, as the lever lowers successive valves are operated. There may be, of course, any desired number of separate connections and valves desired.

Thus the valves are opened successively until the cup has been transformed to the contour of the cavity. When so formed, the formed object is cooled either by admitting a cooling medium to the mold or to the object itself. A cooling medium may be discharged into the object through its upper end. It may be necessary to provide means such as a weight or the like to cause the lever to follow the upper end of the clip downwardly.

In another way, a liquid such as water may be employed to fill the space between the cup and mold cavity. The liquid may be released through connections such as shown so that the cup is caused to conform to the cavity and the liquid may be heated for softening the cup so that its form changing function is enhanced and when transformed to the shape of the cavity it may be cooled in any one of various ways.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The method of forming receptacle-like objects from plastic material adapted to conform to a mold cavity under the influence of heat and pressure which consists in, placing a partially formed plastic receptacle-like object in a mold cavity closed at its lower and open at its upper end and having separate suction outlets spaced from lower to upper end, the said object extending upwardly through the open upper end of the cavity, heating said object, and in connecting said outlets to the action of suction progressively upwardly from the lowermost one thereof to cause portions of the object to be drawn into contact with the cavity progressively.

2. Apparatus for forming receptacle objects from partially formed receptacle-like objects made of plastic material adapted to change shape under the influence of heat and pressure comprising in combination, a mold having a cavity in the shape of a receptacle provided with closed and open lower and open upper ends respectively and a plurality of separate suction outlets spaced from the lower to the upper end of the cavity, a source of vacuum, connections between each of said outlets and said source including valves, and means for operating said valves progressively upwardly from the lowermost one whereby said outlets are connected to said source successively.

LOUIS JOSEPH AIME LAVALLEE.